(12) United States Patent
Appikatala et al.

(10) Patent No.: US 11,803,605 B2
(45) Date of Patent: Oct. 31, 2023

(54) DETERMINING SALIENT ENTITIES AND GENERATING SALIENT ENTITY TAGS BASED UPON ARTICLES

(71) Applicant: Verizon Media Inc., New York, NY (US)

(72) Inventors: Niru Appikatala, Fremont, CA (US); SansWord Huang, San Jose, CA (US); Eyan Goldman, New York, NY (US); Balachandar Sankar, Dublin, CA (US); Shweta Tripathi, Fremont, CA (US)

(73) Assignee: YAHOO AD TECH LLC, New York, NY (US)

( * ) Notice: Subject to any disclaimer, the term of this patent is extended or adjusted under 35 U.S.C. 154(b) by 178 days.

(21) Appl. No.: 17/340,393

(22) Filed: Jun. 7, 2021

(65) Prior Publication Data

US 2022/0391455 A1    Dec. 8, 2022

(51) Int. Cl.
*G06F 16/954* (2019.01)
*G06F 40/169* (2020.01)
(Continued)

(52) U.S. Cl.
CPC .......... *G06F 16/954* (2019.01); *G06F 40/169* (2020.01); *G06F 40/295* (2020.01); *G06F 16/358* (2019.01); *G06F 16/9038* (2019.01)

(58) Field of Classification Search
CPC .. G06F 16/287; G06F 16/3328; G06F 16/338; G06F 16/3338; G06F 16/38;
(Continued)

(56) References Cited

U.S. PATENT DOCUMENTS 9,619,457 B1 *   4/2017   Gillick ................. G06F 40/211
10,296,644 B2 *  5/2019   Zhou .................... G06F 16/951
(Continued)

OTHER PUBLICATIONS

Dunietz, et al., "A New Entity Salience Task with Millions of Training Examples", https://www.aclweb.org/anthology/E14-4040.pdf, Proceedings of the 14th Conference of the European Chapter of the Association for Computational Linguistics, pp. 205-209, Gothenburg, Sweden, Apr. 26-30, 2014.
(Continued)

*Primary Examiner* — Robert W Beausoliel, Jr.
*Assistant Examiner* — Cheryl M Shechtman
(74) *Attorney, Agent, or Firm* — Cooper Legal Group LLC

(57) ABSTRACT

In an example, an article may be analyzed to identify entity terms. Entity term relevance scores associated with the entity terms may be determined based upon the article and the entity terms. One or more first entity terms may be selected based upon the entity term relevance scores. One or more sets of reference position information associated with the one or more first entity terms may be determined. A first set of reference position information is based upon one or more positions, in the article, of one or more references to a first entity term. One or more second entity terms of the one or more first entity terms may be selected based upon the one or more sets of reference position information. A set of one or more salient entity tags associated with the article may be generated based upon the one or more second entity terms.

20 Claims, 11 Drawing Sheets

(51) Int. Cl.
*G06F 40/295* (2020.01)
*G06F 16/35* (2019.01)
*G06F 16/9038* (2019.01)

(58) Field of Classification Search
CPC .... G06F 16/93; G06F 16/951; G06F 16/9535; G06F 16/954; G06F 40/169; G06F 40/295; G06F 40/30; G06F 16/358; G06F 16/9038
See application file for complete search history.

(56) References Cited

U.S. PATENT DOCUMENTS

| | | | |
|---|---|---|---|
| 11,366,966 B1* | 6/2022 | Ramsey | G06F 40/295 |
| 2014/0279730 A1* | 9/2014 | Gamon | G06F 16/951 |
| | | | 707/727 |
| 2020/0065422 A1* | 2/2020 | Yan | G06F 16/313 |
| 2021/0319054 A1* | 10/2021 | Glass | G06F 40/40 |
| 2021/0383070 A1* | 12/2021 | Hunter | G06F 40/30 |

OTHER PUBLICATIONS

Wu, et al., "It all starts with entities: A Salient entity topic model", https://irlab.science.uva.nl/wp-content/papercite-data/pdf/wu-2020-entitytopics.pdf, Natural Language Engineering (2019), 1-19.
Dojchinovski, et al., "Crowdsourced Corpus with Entity Salience Annotations", https://www.aclweb.org/anthology/L16-1527.pdf, pp. 3307-3311, 2014.

* cited by examiner

DETERMINING SALIENT ENTITIES AND GENERATING SALIENT ENTITY TAGS BASED UPON ARTICLES

BACKGROUND

Many services, such as websites, applications, etc. may provide platforms for consuming articles, such as news articles, educational articles, etc. For example, a user may interact with a service. One or more articles may be presented to the user while interacting with the service.

SUMMARY

In accordance with the present disclosure, one or more computing devices and/or methods are provided. In an example, an article may be analyzed to identify a plurality of entity terms, wherein a first entity term of the plurality of entity terms is indicative of a first entity. A plurality of entity term relevance scores associated with the plurality of entity terms may be determined based upon the article and the plurality of entity terms, wherein a first entity term relevance score of the plurality of entity term relevance scores is associated with the first entity term. One or more first entity terms of the plurality of entity terms may be selected based upon the plurality of entity term relevance scores, wherein the one or more first entity terms comprise the first entity term. One or more sets of reference position information associated with the one or more first entity terms may be determined. A first set of reference position information of the one or more sets of reference position information is associated with the first entity term. The first set of reference position information is based upon one or more positions, in the article, of one or more references to the first entity term. One or more second entity terms of the one or more first entity terms may be selected based upon the one or more sets of reference position information, wherein the one or more second entity terms comprise the first entity term. A set of one or more salient entity tags associated with the article may be generated based upon the one or more second entity terms, wherein a first salient entity tag of the set of one or more salient entity tags is indicative of the first entity.

In an example, an article may be analyzed to identify one or more first entity terms of the article. Each entity term of the one or more first entity terms is referred to in the one or more first sections of the article. A first entity term of the one or more first entity terms is indicative of a first entity. One or more first entity term relevance scores associated with the one or more first entity terms may be determined based upon the article and the one or more first entity terms, wherein a first entity term relevance score of the one or more first entity term relevance scores is associated with the first entity term. One or more second entity terms of the one or more first entity terms may be selected based upon the one or more first entity term relevance scores, wherein the one or more second entity terms comprise the first entity term. A set of one or more salient entity tags associated with the article may be generated based upon the one or more second entity terms, wherein a first salient entity tag of the set of one or more salient entity tags is indicative of the first entity.

In an example, an article may be analyzed to identify a plurality of entity terms, wherein a first entity term of the plurality of entity terms is indicative of a first entity. A plurality of entity term relevance scores associated with the plurality of entity terms may be determined based upon the article and the plurality of entity terms, wherein a first entity term relevance score of the plurality of entity term relevance scores is associated with the first entity term. A plurality of sets of reference position information associated with the plurality of entity terms may be determined. A first set of reference position information of the plurality of sets of reference position information is associated with the first entity term. The first set of reference position information is based upon one or more positions, in the article, of one or more references to the first entity term. One or more first entity terms of the plurality of entity terms may be selected based upon the plurality of entity term relevance scores and the plurality of sets of reference position information, wherein the one or more first entity terms comprise the first entity term. A set of one or more salient entity tags associated with the article may be generated based upon the one or more second entity terms, wherein a first salient entity tag of the set of one or more salient entity tags is indicative of the first entity

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
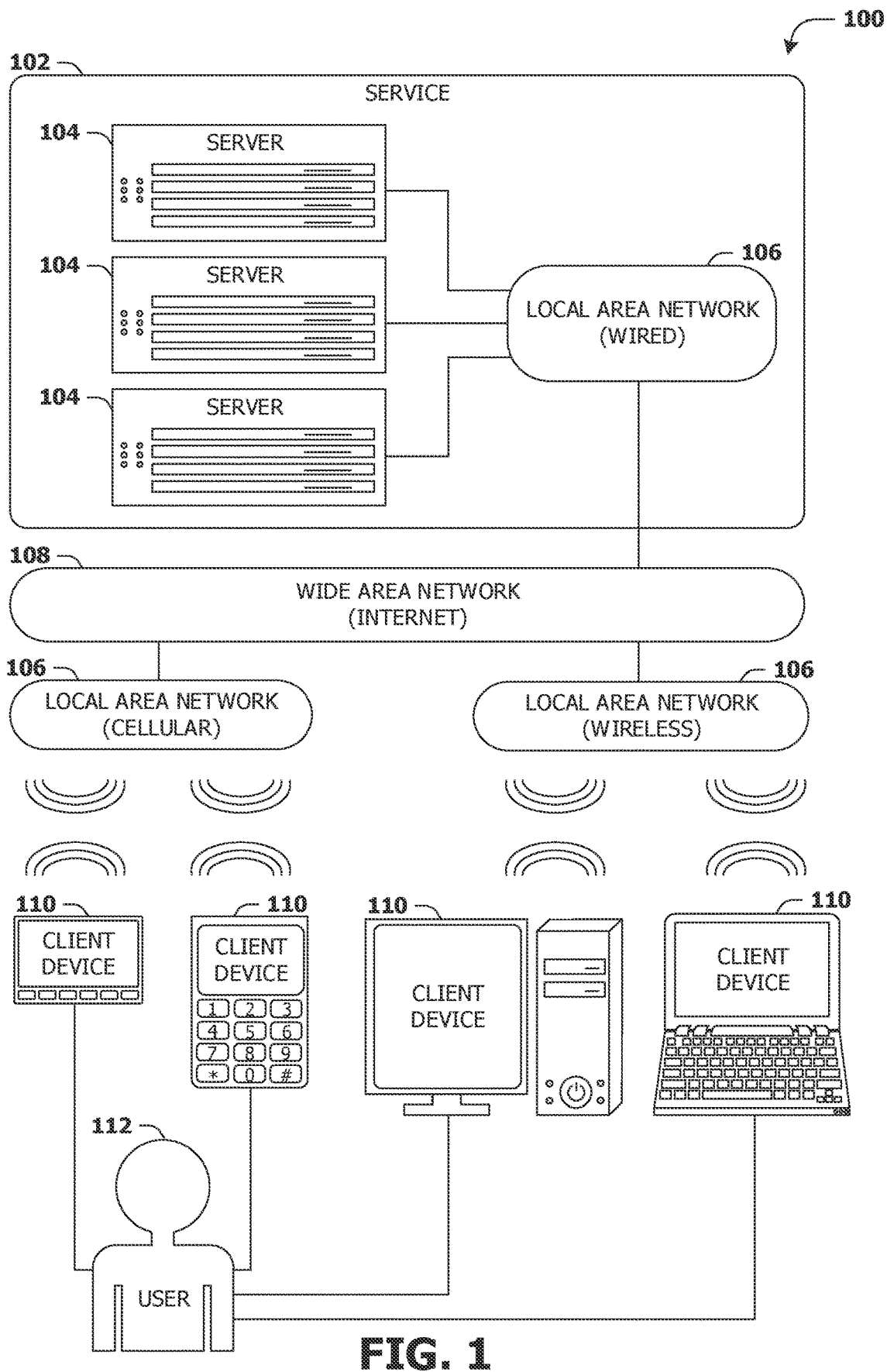
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
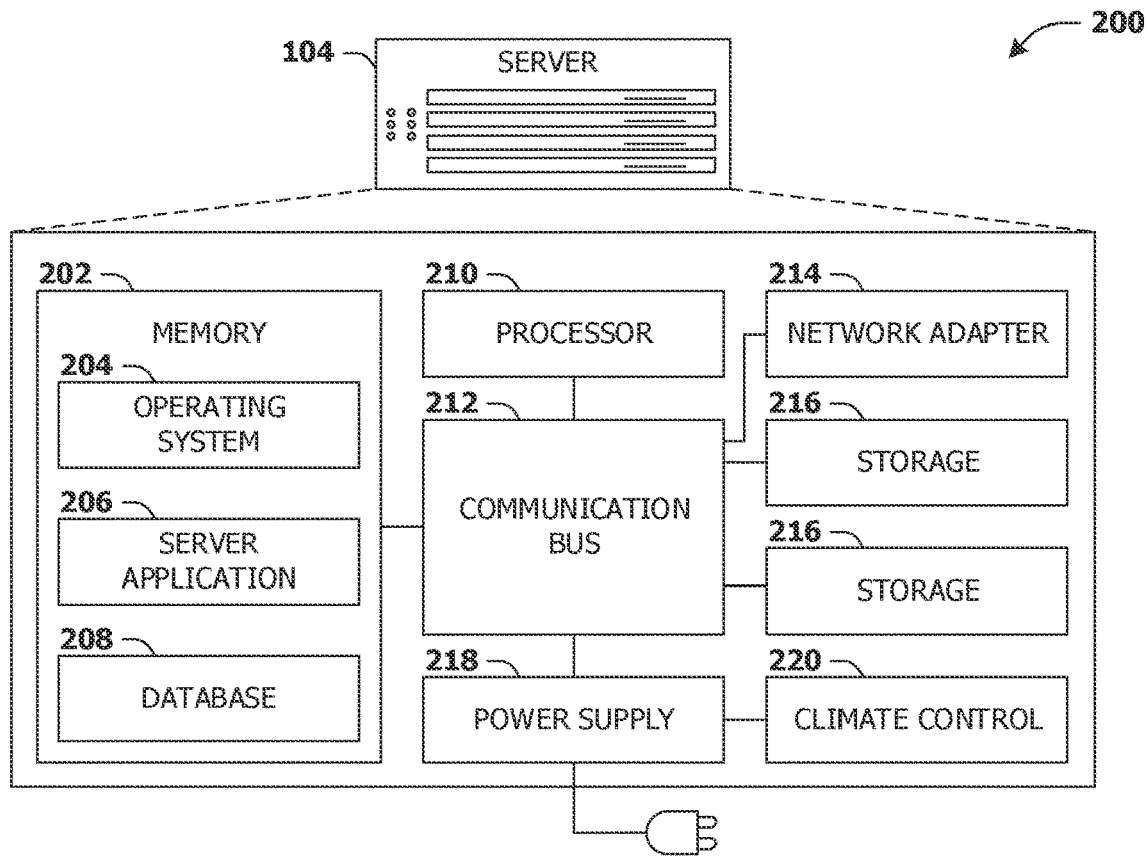
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
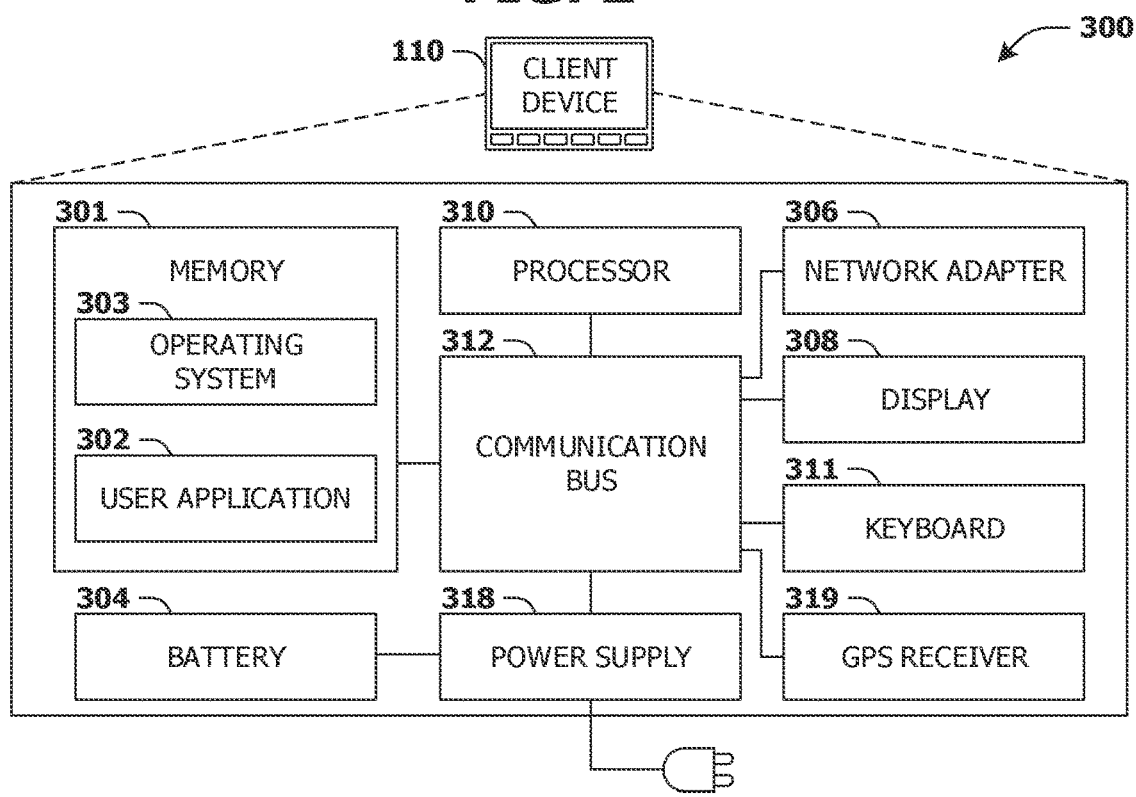
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices, systems, and/or techniques for determining salient entities and/or generating salient entity tags based upon articles are presented. For example, a user (and/or a device associated with the user) may access and/or interact with a service, such as a website, an application, etc. that provides a platform for viewing articles (of the website, the application, etc.). For example, the user may be interested in determining salient entities of an article (e.g., a news article, an educational article, a blog, etc.).

Thus, in accordance with one or more of the techniques presented herein, an article may be analyzed to identify a plurality of entity terms, wherein a first entity term of the plurality of entity terms is indicative of a first entity. A plurality of entity term relevance scores associated with the plurality of entity terms may be determined based upon the article and the plurality of entity terms, wherein a first entity term relevance score of the plurality of entity term relevance scores is associated with the first entity term. One or more first entity terms of the plurality of entity terms may be selected based upon the plurality of entity term relevance scores, wherein the one or more first entity terms comprise the first entity term. One or more sets of reference position information associated with the one or more first entity terms may be determined. A first set of reference position information of the one or more sets of reference position information is associated with the first entity term. The first set of reference position information is based upon one or more positions, in the article, of one or more references to the first entity term. One or more second entity terms of the one or more first entity terms may be selected based upon the one or more sets of reference position information, wherein the one or more second entity terms comprise the first entity term. A set of one or more salient entity tags associated with the article may be generated based upon the one or more second entity terms, wherein a first salient entity tag of the set of one or more salient entity tags is indicative of the first entity. For example, the set of one or more salient entity tags may be indicative of one or more salient entities of the article. The article and/or one or more representations of one or more salient entity tags of the set of one or more salient entity tags may be displayed via the device associated with the user (such as in response to receiving a request from the device to present the article).

Figure 4:
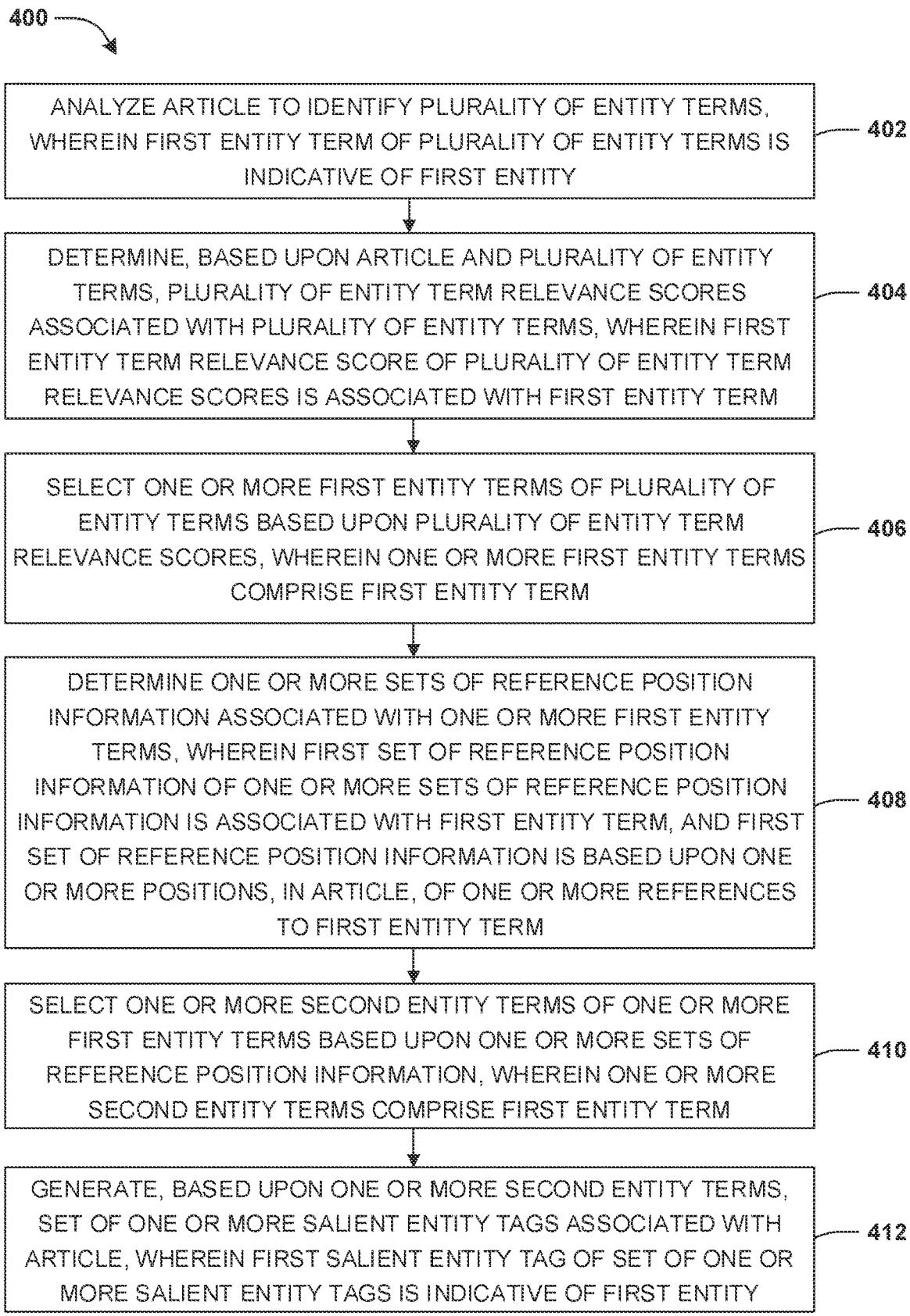
FIG. 4 is a flow chart illustrating an example method for determining salient entities and/or generating salient entity tags based upon articles.

An embodiment of determining salient entities and/or generating salient entity tags based upon articles is illustrated by an example method 400 of FIG. 4, and is further described in conjunction with system 501 of FIGS. 5A-5G. A content system for presenting content via client devices may be provided. For example, client devices may access and/or interact with one or more services, such as one or more web pages, one or more applications, one or more content interfaces, etc. for viewing and/or downloading content items from one or more servers associated with the content system. For example, the content items may comprise at least one of articles, video content items, audio content items, etc. The term "article" as used herein may refer to any set of text, such as at least one of a news article, an educational article, a research paper, a sports article, an informational article, a blog, a transcript of an audio clip, a transcript of a video clip, an email, a social media post, a text message, an instant message, etc.

Figure 5A:
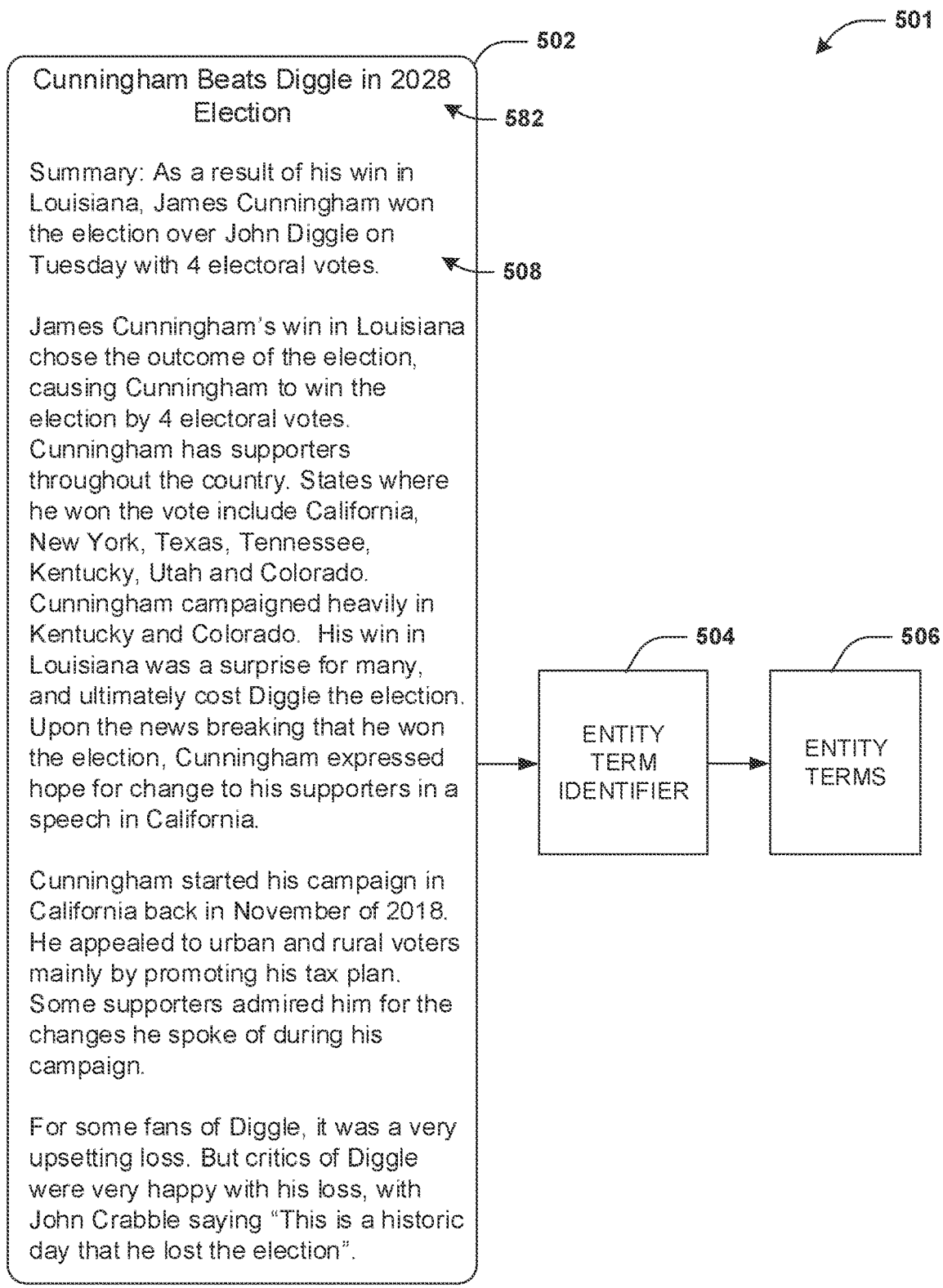
FIG. 5A is a component block diagram illustrating an example system for determining salient entities and/or generating salient entity tags based upon articles, where a plurality of entity terms of an article is identified.

An article 502, such as shown in FIG. 5A, may be identified. In some examples, the article 502 may be identified within a content item database associated with the content system. Alternatively and/or additionally, the article 502 may be identified and/or selected for determination of a set of one or more salient entities and/or generation of a set of one or more salient entity tags associated with the article 502 in response to the article 502 being included (e.g., stored) in the content item database (and/or in response to the article 502 being uploaded to the content item database). Alternatively and/or additionally, the article 502 may be identified and/or selected for determination of the set of one or more salient entities and/or generation of the set of one or more salient entity tags in response to the article 502 being published and/or accessible via one or more services (such as one or more web pages, one or more applications, one or more content interfaces, etc.) associated with the content system. Alternatively and/or additionally, the article 502 may be identified and/or selected for determination of the set of one or more salient entities and/or generation of the set of one or more salient entity tags based upon an amount of activity associated with the article 502. The amount of activity may correspond to a number of instances of the article 502 being accessed (such as being accessed by client devices via the content system). Alternatively and/or additionally, the amount of activity may correspond to a frequency of instances of the article 502 being accessed (e.g., a number of instances of the article 502 being accessed in an hour, a number of instances of the article 502 being accessed in a day, etc. via the content system). For example, the article 502 may be identified and/or selected for determination of the set of one or more salient entities and/or generation of the set of one or more salient entity tags in response to a determination that the amount of activity exceeds a threshold amount of activity. Alternatively and/or additionally, the article 502 may be identified and/or selected for determination of the set of one or more salient entities and/or generation of the set of one or more salient entity tags in response to receiving a request to determine the set of one or more salient entities associated with the article 502 and/or to generate the set of one or more salient entity tags associated with the article 502. For example, the request may comprise the article 502. Alternatively and/or additionally, the request may comprise an indication of the article 502. For example, the article 502 may be retrieved using the indication of the article 502 (e.g., the indication may comprise a web address of the article 502 from which the article 502 can be retrieved).

At 402, the article 502 may be analyzed to identify a plurality of entity terms 506 (such as shown in FIG. 5A). An entity term of the plurality of entity terms 506 (and/or each entity term of the plurality of entity terms 506) may be indicative of an entity. As shown in FIG. 5A, the article 502 may be input to an entity term identification module 504, for example. The entity term identification module 504 may analyze the article 502 to identify the plurality of entity terms 506.

In some examples, entity terms (e.g., named entities) of the plurality of entity terms 506 may be indicative of entities comprising at least one of one or more places (e.g., countries, cities, geographic locations, etc.), one or more people (e.g., people of a particular location, people with a particular occupation, politicians, celebrities, socialites, etc.), one or more things (e.g., devices, natural objects, etc.), one or more organizations, one or more companies, one or more stock symbols, one or more ticker symbols, one or more ideas, one or more systems, one or more objects (e.g., one or more abstract objects and/or one or more physical objects), one or more events, one or more historical events, one or more current events, one or more concepts, etc.

In some examples, at least some entity terms of the plurality of entity terms 506 may be identified using one or more named-entity recognition (NER) techniques (e.g., entity identification, entity chunking and/or entity extraction). In some examples, at least some entity terms of the plurality of entity terms 506 may be identified using one or more informational databases, such as using one or more dictionary-based entity identification techniques. For example, the article 502 and/or portions of the article 502 may be compared with one or more resources (e.g., an entity dictionary, a list of entity terms, an encyclopedia, an online encyclopedia, a news channel, a news website, a website, a book, a research article, a research article database and/or a different type of informational database, etc.) to identify the plurality of entity terms 506.

In an example, the plurality of entity terms 506 may comprise a first entity term "James Cunningham" indicative of a first entity (e.g., a person named James Cunningham), a second entity term "John Diggle" indicative of a second entity (e.g., a person named John Diggle), a third entity term "California" indicative of a third entity (e.g., the state of California), a fourth entity term "2028 Election" indicative of a fourth entity (e.g., an election in the year 2028), etc.

Figure 5B:
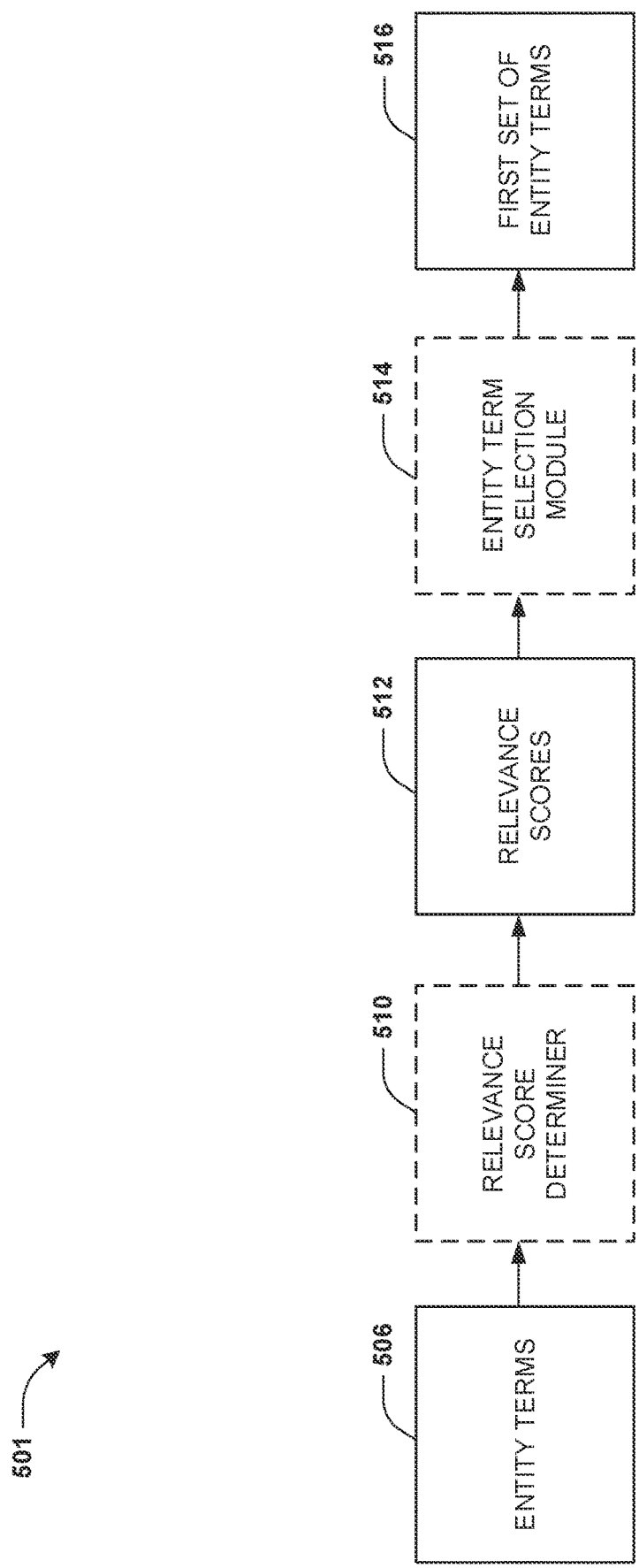
FIG. 5B is a component block diagram illustrating an example system for determining salient entities and/or generating salient entity tags based upon articles, where a plurality of entity term relevance scores associated with a plurality of entity terms is determined and/or a first set of one or more entity terms is selected based upon the plurality of entity term relevance scores.

At 404, a plurality of entity term relevance scores 512 associated with the plurality of entity terms 506 may be determined (such as shown in FIG. 5B). As shown in FIG. 5B, the plurality of entity terms 506 and/or the article 502 may be input to an entity term relevance score determiner 510, for example. The entity term relevance score determiner 510 may analyze the plurality of entity terms 506 and/or the article 502 to determine the plurality of entity term relevance scores 512. An entity term relevance score (e.g., a relevance score, an aboutness score, an importance score) of the plurality of entity term relevance scores 512 may be associated with an entity term of the plurality of entity terms 506.

In an example, the plurality of entity term relevance scores 512 may comprise a first entity term relevance score associated with the first entity term (e.g., "James Cunningham"). In some examples, the first entity term relevance score associated with the first entity term may correspond to a measure of relevance and/or importance (e.g., contextual relevance and/or importance) of the first entity term to the article 502. The first entity term relevance score may be determined by analyzing the article 502 based upon the first entity term. In some examples, the first entity term relevance score associated with the first entity term may be determined using one or more machine learning techniques. For example, the first entity term relevance score and/or other entity term relevance scores of the plurality of entity term relevance scores 512 may be generated using a machine learning model based upon at least one of the article 502, the plurality of entity terms 506, etc.

In some examples, the first entity term relevance score associated with the first entity term may be determined based upon a frequency of references to the first entity term in the article 502 (e.g., the frequency of references to the first entity term may be based upon a number of instances that the entity is referred to and/or stated in the article 502 and/or based upon a number of references, to the first entity term, of the article 502). In an example, a reference to the first entity term may correspond to a term that refers to and/or indicates the first entity term.

A reference to the first entity term may be identified using one or more natural language processing (NLP) techniques and/or one or more text analysis techniques. For example, a reference to the first entity term may be identified using one or more coreference resolution techniques. In an example, a reference to the first entity term may comprise the first entity term (e.g., the reference may comprise "James Cunningham") and/or the reference may be identified based upon the reference matching the first entity term. Alternatively and/or additionally, a reference to the first entity term may comprise a portion of the first entity term (e.g., the reference may comprise "Cunningham") and/or the reference may be identified based upon the reference matching the portion of the first entity term. For example, for entity terms corresponding to people, a reference to an entity term may be identified based upon a determination that the reference comprises a last name (e.g., surname) of a person corresponding to the entity term. Alternatively and/or additionally, for entity terms corresponding to companies and/or organizations, a reference to an entity term may be identified based upon a determination that the reference comprises at least one of an abbreviation of a company and/or an organization, a portion of a name of the company and/or the organization, etc. Alternatively and/or additionally, a reference to the first entity term may comprise a pronoun referring to the first entity term (e.g., the reference may comprise at least one of "he", "she", "it", "they", etc.) and/or the reference may be identified by using one or more coreference resolution techniques (and/or other techniques) to determine that the pronoun refers to the first entity term. Alternatively and/or additionally, a reference to the first entity term may comprise a term, other than a pronoun, referring to the first entity term (e.g., the reference may comprise "the President", or POTUS, etc. to refer to the first entity term) and/or the reference may be identified by using one or more coreference resolution techniques (and/or other techniques) to determine that the term refers to the first entity term.

At 406, a first set of one or more entity terms 516 of the plurality of entity terms 506 may be selected based upon the plurality of entity term relevance scores 512 (such as shown in FIG. 5B). For example, the first set of one or more entity terms 516 may be selected from among the plurality of entity terms 506. The first set of one or more entity terms 516 may be selected based upon a determination that one or more first entity term relevance scores (of the plurality of entity term relevance scores 512), associated with the first set of one or more entity terms 516, exceed a threshold entity term relevance score.

In an example, the first set of one or more entity terms 516 may comprise the first entity term and/or the one or more first entity term relevance scores associated with the first set of one or more entity terms 516 may comprise the first entity term relevance score associated with the first entity term. The first entity term may be selected (for inclusion in the first set of one or more entity terms 516) based upon a determination that the first entity term relevance score exceeds the threshold entity term relevance score. In an example, the first entity term relevance score may be 0.65 and/or the threshold entity term relevance score may be 0.5, where the first entity term is selected based upon 0.65 exceeding 0.5.

Alternatively and/or additionally, an entity term of the plurality of entity terms 506 may not be included in the first set of one or more entity terms 516 based upon a determination that an entity term relevance score, of the plurality of entity term relevance scores 512, associated with the entity term does not meet the threshold entity term relevance score.

At 408, one or more sets of reference position information associated with the first set of one or more entity terms may be determined. In some examples, a first set of reference position information of the one or more sets of reference position information is associated with the first entity term. The first set of reference position information may be based upon one or more positions, in the article 502, of one or more references to the first entity term.

In an example, the first set of reference position information may be indicative of whether one or more first sections of the article 502 comprise a reference to the first entity term. The one or more first sections may comprise a summary 508 (shown in FIG. 5A) and/or a title 582 (shown in FIG. 5A) of the article 502. Alternatively and/or additionally, the one or more first sections may comprise one or more paragraphs of the article 502, such as at least one of an initial paragraph of the article 502, an initial set of multiple paragraphs of the article 502, a last paragraph of the article 502, a last set of multiple paragraphs of the article 502, etc. Alternatively and/or additionally, for each section of the one or more first sections, the first set of reference position information may be indicative of whether the section comprises a reference to the first entity term. For example, the first set of reference position information may be indicative of at least one of whether a first section of the one or more first sections comprises a reference to the first entity term, whether a second section of the one or more first sections comprises a reference to the first entity term, etc. In some examples, the one or more first sections may amount to merely a portion of the article 502 (e.g., the one or more first seconds may not comprise the entirety of the article 502).

Figure 5C:
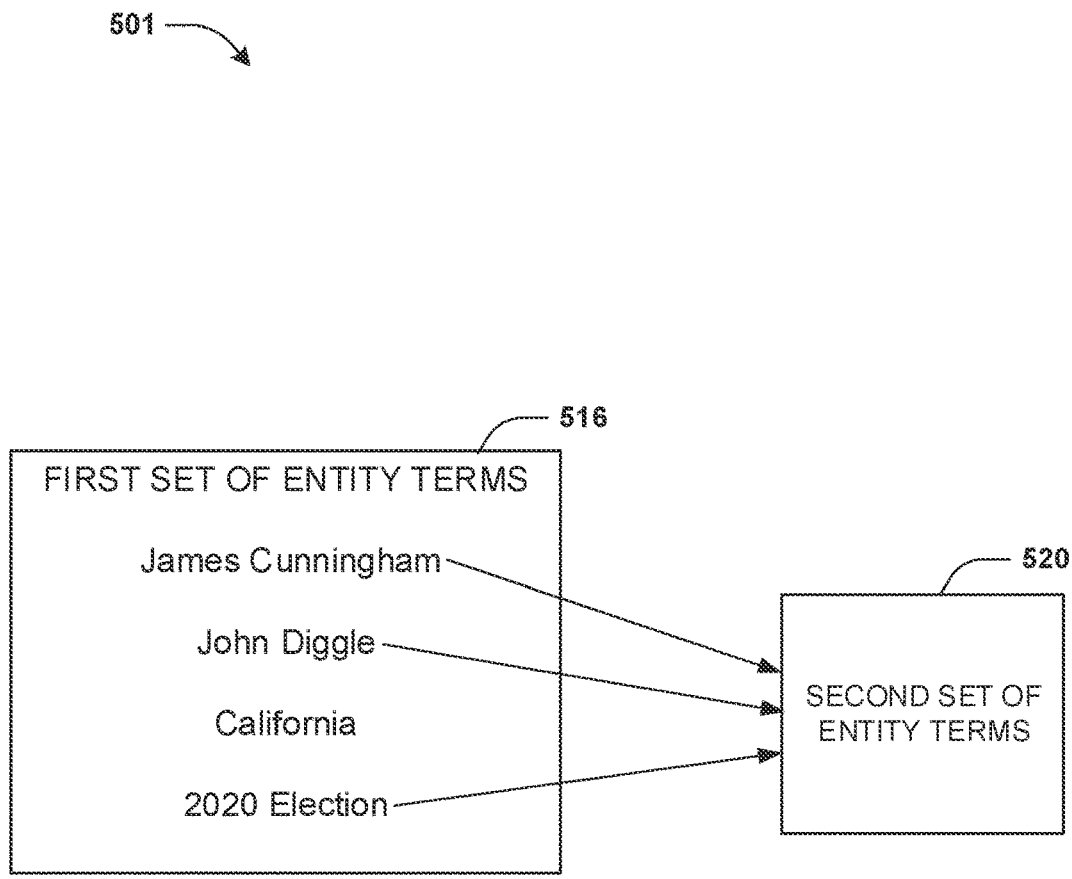
FIG. 5C is a component block diagram illustrating an example system for determining salient entities and/or generating salient entity tags based upon articles, where a second set of one or more entity terms is selected.

At 410, a second set of one or more entity terms 520 of the first set of one or more entity terms 516 may be selected (such as shown in FIG. 5C). For example, the second set of one or more entity terms 520 may be selected from among the first set of one or more entity terms 516. The second set of one or more entity terms 520 may be selected based upon the one or more sets of reference position information.

In an example shown in FIG. 5C, the first set of one or more entity terms 516 may comprise the first entity term "James Cunningham", the second entity term "John Diggle", the third entity term "California" and/or the fourth entity term "2028 Election". In the example, the first entity term, the second entity term and/or the fourth entity term may be selected for inclusion in the second set of one or more entity terms 520, and/or the third entity term may not be selected for inclusion in the second set of one or more entity terms 520.

In some examples, an entity term of the first set of one or more entity terms 516 may be selected for inclusion in the second set of one or more entity terms 520 based upon a determination that the one or more first sections of the article 502 comprise a reference to the entity term. Alternatively and/or additionally, an entity term of the first set of one or more entity terms 516 may be selected for inclusion in the second set of one or more entity terms 520 based upon a determination that each section of the one or more first sections of the article comprises a reference to the second set of one or more entity terms 520.

In an example, the first entity term "James Cunningham" may be selected for inclusion in the second set of one or more entity terms 520 based upon a determination that the one or more first sections of the article 502 comprise a reference (e.g., "Cunningham", "James Cunningham", etc.) to the first entity term. Alternatively and/or additionally, the first entity term may be selected for inclusion in the second set of one or more entity terms 520 based upon a determination that each section of the one or more first sections of the article 502 comprises a reference to the first entity. In an example in which the one or more first sections comprise the title 582 of the article 502 and the summary 508 of the article 502, the first entity term may be selected for inclusion in the second set of one or more entity terms 520 based upon a determination that the title 582 comprises a reference (e.g., "Cunningham") to the first entity term and that the summary 508 comprises a reference (e.g., "James Cunningham") to the first entity term.

Alternatively and/or additionally, an entity term of the first set of one or more entity terms 516 may not be included in the second set of one or more entity terms 520 based upon a determination that the one or more first sections do not comprise a reference to the entity term. In an example in which the one or more first sections comprise the title 582 of the article 502 and the summary 508 of the article 502, the third entity term (e.g., "California") may not be included in the second set of one or more entity terms 520 based upon a determination that the one or more first sections do not comprise a reference to the third entity term.

Alternatively and/or additionally, an entity term of the first set of one or more entity terms 516 may not be included in the second set of one or more entity terms 520 based upon a determination that a section of the one or more first sections does not comprise a reference to the entity term.

Alternatively and/or additionally, one or more scores associated with the first set of one or more entity terms 516 may be determined based upon the one or more first entity term relevance scores (associated with the first set of one or more entity terms 516) and/or the one or more sets of reference position information (associated with the first set of one or more entity terms 516). In an example, the one or more scores may comprise a first score associated with the first entity term of the first set of one or more entity terms 516. The first score may be determined based upon the first entity term relevance score and/or the first set of reference position information. For example, the first score may be determined based upon whether the one or more first sections of the article 502 comprise a reference to the first entity term (e.g., the first score may be higher if the one or more first sections comprise a reference to the first entity term than if the one or more first sections do not comprise a reference to the first entity term). Alternatively and/or additionally, the first score may be determined based upon a quantity of references to the first entity term in the one or more first sections of the article 502 (e.g., a higher quantity of references to the first entity term in the one or more first sections of the article 502 may correspond to a higher value of the first score). Alternatively and/or additionally, the first score may be determined based upon a quantity of sections, of the one or more first sections, that comprise a reference to the first entity term (e.g., a higher quantity of sections that comprise a reference to the first entity term may correspond to a higher value of the first score). In an example in which the one or more first sections comprise the title 582 of the article 502 and the summary 508 of the article 502, the first score may be higher if both the title 582 and the summary 508 comprise a reference to the first entity term than if merely one of the title 582 or the summary 508 comprises a reference to the first entity term. Alternatively and/or additionally, the first score may be determined based upon a section, of the one or more first sections, that comprises a reference to the first entity term. For example, whether the first section of the one or more first sections comprises a reference to the first entity term may have a higher weight in determining the first score than whether the second section of the one or more first sections comprises a reference to the first entity term (e.g., the first score may be higher if merely the first section of the one or more first sections comprises a reference to the first entity term than if merely the second section of the one or more first sections comprises a reference to the first entity term). In an example, whether the title 582 of the article 502 comprises a reference to the first entity term may have a higher weight in determining the first score than whether the summary 508 of the article 502 comprises a reference to the first entity term (e.g., the first score may be higher if merely the title 582 of the article 502 comprises a reference to the first entity term than if merely the summary 508 of the article 502 comprises a reference to the first entity term).

In some examples, an entity term of the first set of one or more entity terms 516 may be selected for inclusion in the second set of one or more entity terms 520 based upon a determination that a score (of the one or more scores) associated with the entity term exceeds a threshold score. For example, the first entity term may be selected for inclusion in the second set of one or more entity terms 520 based upon a determination that the first score exceeds the threshold score.

In some examples, an entity term of the first set of one or more entity terms 516 may not be included in the second set of one or more entity terms 520 based upon a determination that a score (of the one or more scores) associated with the entity term does not meet the threshold score.

At 412, a set of one or more salient entity tags associated with the article 502 may be generated based upon the second set of one or more entity terms 520. In some examples, the set of one or more salient entity tags may be indicative of one or more salient entities of the article (e.g., each salient entity tag may be indicative of a salient entity of the article). In some examples, a salient entity may correspond to an entity, referred to in the article 502, determined to be important and/or relevant to the article 502 (e.g., more important and/or relevant than other entities referred to in the article 502), wherein the salient entity may stand out to a reader reading the article 502.

In some examples, a salient entity tag of the set of one or more salient entity tags may be associated with an entity term of the second set of one or more entity terms 520. For example, a first salient entity tag of the set of one or more salient entity tags may be associated with the first entity term of the second set of one or more entity terms 520. Alternatively and/or additionally, the first salient entity tag may comprise the first entity term. Alternatively and/or additionally, the first salient entity tag may be indicative of the first entity (corresponding to the first entity term).

In some examples, one or more entity terms of the second set of one or more entity terms 520 may be mapped to one or more entities (e.g., the first entity term may be mapped to the first entity, the second entity term may be mapped to the second entity, etc.) identified by a database (e.g., a list of entities). For example, the first entity associated with the first entity term may be determined. In an example, one or more entity disambiguation techniques may be used to determine the first entity associated with the first entity term. The one or more entity disambiguation techniques may comprise identifying one or more entities, comprising the first entity, based upon the first entity term.

In an example, the one or more entities may correspond to one or more entities with entity identities (e.g., entity names) that match (and/or are similar to and/or correspond to) the first entity term. In an example where the first entity term comprises "James Cunningham", the one or more entities may comprise the first entity (e.g., a politician named James Cunningham) and/or a fifth entity (e.g., a basketball player named James Cunningham). The one or more entities may be identified by analyzing a database (e.g., the list of entities) to determine that the first entity term matches (and/or is similar to and/or corresponds to) one or more identities (indicated by the list of entities, for example) of the one or more entities.

Figure 5D:
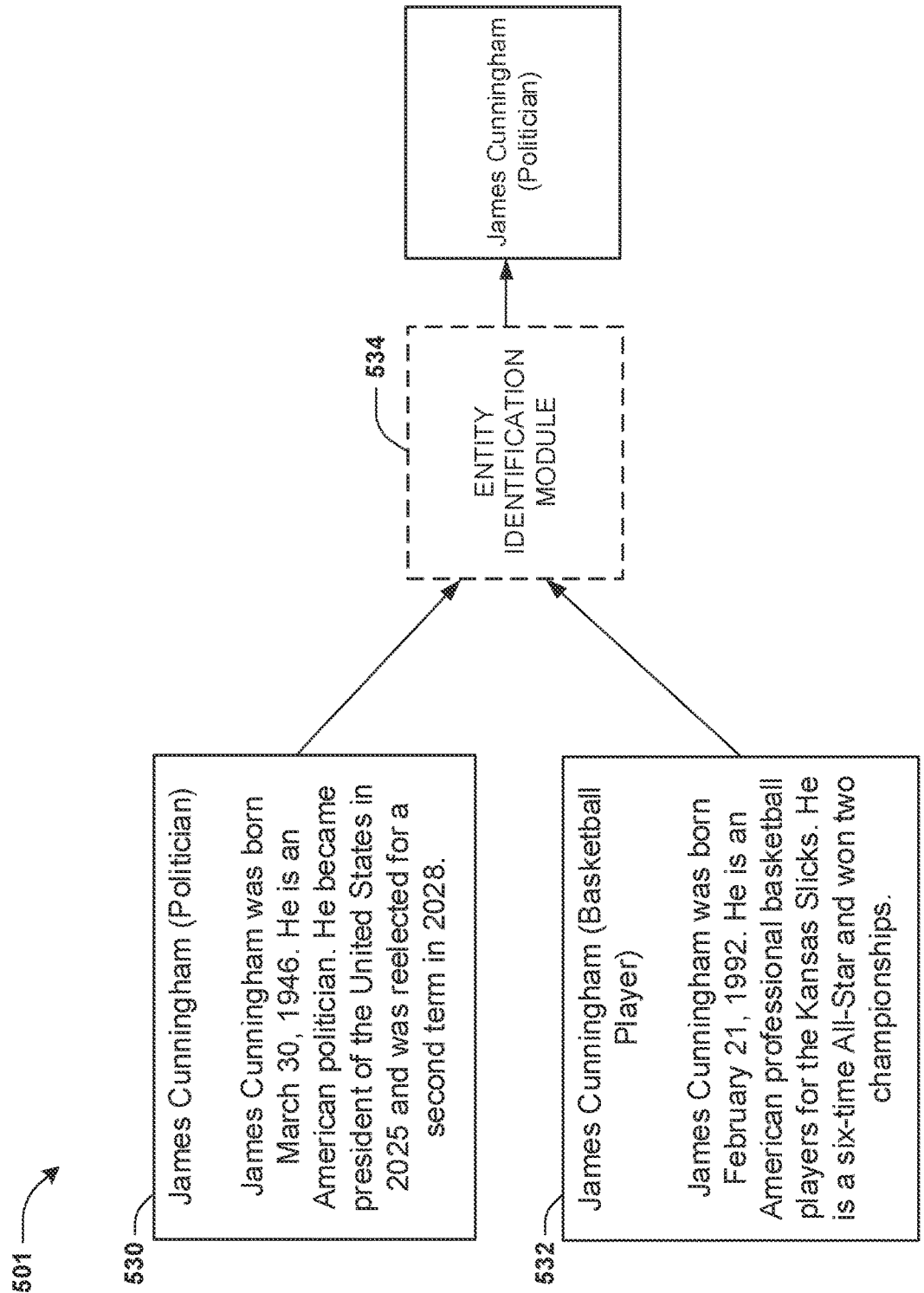
FIG. 5D is a component block diagram illustrating an example system for determining salient entities and/or generating salient entity tags based upon articles, where a first entity associated with a first entity term is determined.

FIG. 5D illustrates determination of the first entity associated with the first entity term. In some examples, an informational database may be analyzed based upon the first entity term to identify one or more informational articles associated with the first entity term. Alternatively and/or additionally, the informational database may be analyzed based upon the one or more entities to identify the one or more informational articles associated with the first entity term. In an example, each informational article of the one or more informational articles may be associated with (e.g., about) an entity of the one or more entities. For example, the one or more informational articles may comprise a first informational article 530 and/or a second informational article 532.

In some examples, the informational database may be associated with a web encyclopedia (e.g., a web-based encyclopedia). In some examples, informational articles of the plurality of informational articles may be edited by editors associated with the informational database (e.g., information and/or content may be added to informational articles of the plurality of informational articles, information and/or content may be removed from informational articles of the plurality of informational articles, etc.). Alternatively and/or additionally, the informational database may be based upon a model of openly editable content where informational articles of the plurality of informational articles may be edited by one or more of users, computers (e.g., bots), etc. via editing processes associated with the informational database (in accordance with rules and/or guidelines associated with the informational database).

In some examples, the first informational article 530 may be identified based upon a determination that a title and/or a header of the first informational article 530 comprises, is similar to and/or matches the first entity term. Alternatively and/or additionally, the first informational article 530 may be identified based upon a determination that the first informational article 530 is about the first entity of the one or more entities. In some examples, the first informational article 530 may correspond to a definition and/or description of the first entity. Alternatively and/or additionally, the second informational article 532 may be identified based upon a determination that a title and/or a header of the second informational article 532 comprises, is similar to and/or matches the first entity term. Alternatively and/or additionally, the second informational article 532 may be identified based upon a determination that the second informational article 532 is about the fifth entity of the one or more entities. In some examples, the second informational article 532 may correspond to a definition and/or description of the fifth entity. The one or more informational articles may be accessed via the informational database and/or downloaded for analysis.

In some examples, the one or more informational articles may be input to an entity identification module 534. The entity identification module 534 may determine the first entity associated with the first entity term based upon the one or more informational articles. In some examples the article 502 may be compared with the one or more informational articles to determine one or more similarity scores. A similarity score of the one or more similarity scores may be associated with a similarity between the article 502 and an informational article of the one or more informational articles. For example, the one or more similarity scores may comprise a first similarity score (e.g., a first cosine similarity) associated with a first similarity between the article 502 and the first informational article 530 and/or a second similarity score (e.g., a second cosine similarity) associated with a second similarity between the article 502 and the second informational article 532. In an example, the article 502 may be compared with the first informational article 530 to determine the first similarity score. Alternatively and/or additionally, the article 502 may be compared with the second informational article 532 to determine the second similarity score.

In some examples, the first similarity score may be determined based upon at least one of a measure (e.g., quantity) of words that are common to the article 502 and the first informational article 530, a measure (e.g., quantity) of phrases that are common to the article 502 and the first informational article 530, etc. Alternatively and/or additionally, the first similarity score may be determined by generating a first article representation (e.g., a vector representation and/or an embedding based representation) of the article 502 and/or a second article representation (e.g., a vector representation and/or an embedding based representation) of the first informational article 530, wherein one or more operations (e.g., mathematical operations) may be performed using the first article representation and the second article representation to determine the first similarity score (e.g., the first similarity score may be based upon (and/or may be equal to) a measure of similarity between the first article representation and the second article representation, such as a cosine similarity between the first article representation and the second article representation). In some examples, the second similarity score may be determined using one or more of the techniques provided herein with respect to determining the first similarity score.

In some examples, the first similarity score may be compared with a threshold similarity score to determine whether the first entity term of the article 502 is indicative of the first entity. In an example, it may be determined that the first entity term of the article 502 is indicative of the first entity (and not the fifth entity, for example) based upon a determination that the first similarity score exceeds the threshold similarity score and/or that the first similarity score is a highest similarity score of the one or more similarity scores. In an example shown in FIG. 5D, the entity identification module 534 may determine that the first entity term of the article 502 is indicative of the first entity (e.g., James Cunningham (Politician)), such as based upon the determination that the first similarity score exceeds the threshold similarity score and/or that the first similarity score is the highest similarity score of the one or more similarity scores.

In some examples, the set of one or more salient entity tags associated with the article 502 may be generated based upon the determination that the first entity term of the article 502 is indicative of the first entity (and/or based upon the determination that the first similarity score exceeds the second similarity score). For example, the first salient entity tag may be indicative of the first entity based upon the determination that the first entity term of the article 502 is indicative of the first entity (and/or based upon the determination that the first similarity score exceeds the second similarity score). Alternatively and/or additionally, the first salient entity tag (indicative of the first entity term and/or the first entity, for example) may be included in the set of one or more salient entity tags based upon the determination that the first entity term of the article 502 is indicative of the first entity.

In some examples, it may be determined that the first entity term of the article 502 is ambiguous and/or is not indicative of an entity of the one or more entities based upon a determination that the one or more similarity scores do not comprise a similarity score that exceeds the threshold similarity score (e.g., each similarity score of the one or more similarity scores does not meet the threshold similarity score). In some examples, the first salient entity tag may not be included in the set of one or more salient entity tags based upon the determination that the first entity term of the article 502 is ambiguous and/or is not indicative of an entity of the one or more entities (and/or based upon the determination that the one or more similarity scores do not comprise a similarity score that exceeds the threshold similarity score). Alternatively and/or additionally, a salient entity tag associated with the first entity term of the article 502 may not be generated for inclusion in the set of one or more salient entity tags based upon the determination that the first entity term of the article 502 is ambiguous and/or is not indicative of an entity of the one or more entities (and/or based upon the determination that the one or more similarity scores do not comprise a similarity score that exceeds the threshold similarity score).

In some examples, the set of one or more salient entity tags may be stored as metadata of the article 502. Alternatively and/or additionally, the set of one or more salient entity tags may be stored in a content item database comprising a plurality of sets of content item information associated with a plurality of content items (e.g., articles, videos, images, audio files, etc.). For example, a first set of content information of the plurality of sets of content item information may comprise the article 502 and/or the set of one or more salient entity tags (and/or other information associated with the article 502).

Alternatively and/or additionally, the first set of content information may comprise one or more sets of entity types associated with the set of one or more salient entity tags. In some examples, a set of one or more entity types of the one or more sets of entity types is associated with a salient entity tag of the salient entity tags and/or may be indicative of one or more entity super-types and/or one or more entity sub-types associated with an entity indicated by the salient entity tag.

In an example, the one or more sets of entity types may comprise a first set of one or more entity types associated with the first salient entity tag of the set of one or more salient entity tags. In an example, the first set of one or more entity types may be determined based upon the first entity and/or the first salient entity tag. The first set of one or more entity types may comprise one or more entity super-types and/or one or more entity sub-types associated with the first entity. In an example, the first set of one or more entity types may comprise at least one of an entity super-type corresponding to "person", an entity sub-type corresponding to "politician", an entity sub-type corresponding to "president", an entity sub-type corresponding to "senator" (such as in an example in which the first entity is and/or was a senator), etc.

Figure 5E:
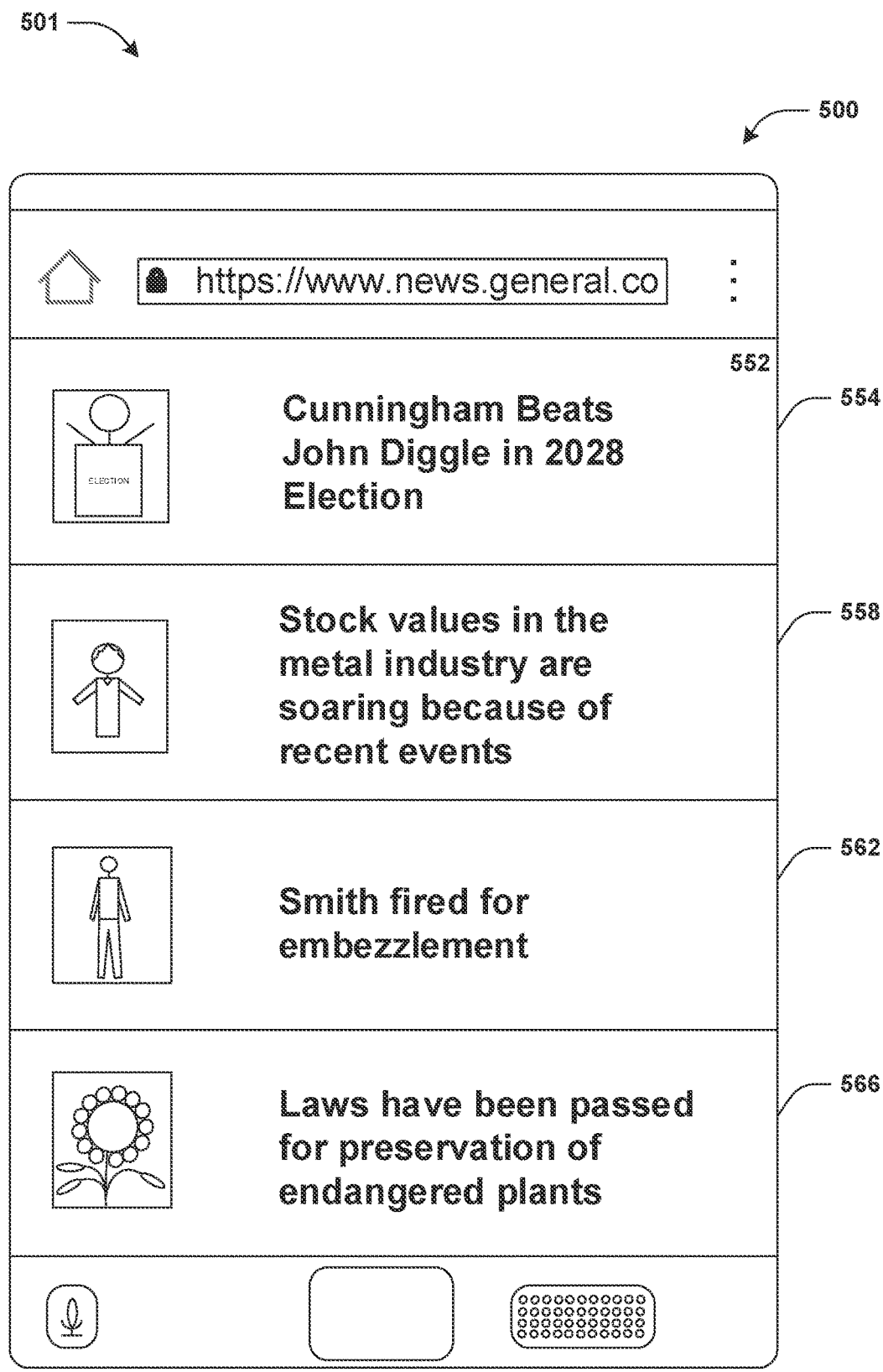
FIG. 5E is a component block diagram illustrating an example system for determining salient entities and/or generating salient entity tags based upon articles, where a first client device displays a content list.

FIG. 5E illustrates an exemplary scenario in which a first client device 500 (e.g., a phone, a laptop, a computer, a wearable device, a smart device, a television, any other type of computing device, hardware and/or software) displays a content list (e.g., a list of content items). The content list may be displayed via a web page 552. The content list may comprise a set of one or more selectable list items associated with a set of one or more content items comprising the article 502. For example, the set of one or more selectable list items may comprise a first selectable list item 554 associated with the article 502 and/or other selectable list items 558, 562 and/or 566 associated with other content items.

In some examples, the content list may be displayed (and/or accessed) via the first client device 500 in response to receiving a request, from the first client device 500, to present the content list (e.g., the request to present the content list may correspond to a request to access the web page 552). In some examples, the article 502 may be selected for inclusion in the content list based upon the set of one or more salient entity tags associated with the article 502 and/or a user profile associated with the first client device 500. For example, the article 502 may be selected for inclusion in the content list based upon a determination that a user associated with the first client device 500 is interested in one or more entities associated with one or more salient entity tags of the set of one or more salient entity tags (e.g., the determination that the user associated with the first client device 500 is interested in one or more entities associated with one or more salient entity tags of the set of one or more salient entity tags may be based upon interest information, of the user profile, indicative of one or more entities that the user is interested in). Alternatively and/or additionally, the article 502 may be selected for inclusion in the content list based upon a determination that historical activity information, comprised in the user profile, is indicative of the first client device 500 having accessed one or more content items (e.g., articles, videos, images, audio files, etc.) that are about and/or that comprise indications of one or more entities associated with one or more salient entity tags of the set of one or more salient entity tags. For example, the article 502 may be selected for inclusion in the content list based upon a determination that the historical activity information associated with the first client device 500 is indicative of one or more content items (accessed by the first client device 500, for example) associated with the first entity (e.g., the one or more content items may be about and/or may comprise indications of the first entity). Alternatively and/or additionally, the article 502 may be selected for inclusion in the content list based upon a determination that the user associated with the first client device 500 is interested in one or more entity types (e.g., entity super-types and/or entity sub-types) associated with one or more salient entity tags of the set of one or more salient entity tags (e.g., the determination that the user associated with the first client device 500 is interested in one or more entity types associated with one or more salient entity tags of the set of one or more salient entity tags may be based upon interest information, of the user profile, indicative of one or more entity types that the user is interested in). Alternatively and/or additionally, the article 502 may be selected for inclusion in the content list based upon a determination that the historical activity information, comprised in the user profile, is indicative of the first client device 500 having accessed one or more content items (e.g., articles, videos, images, audio files, etc.) that are about and/or that comprise indications of one or more entity types (e.g., entity super-types and/or entity sub-types) associated with one or more salient entity tags of the set of one or more salient entity tags.

In an example in which the first salient entity tag of the set of one or more salient entity tags is indicative of the first entity (e.g., James Cunningham), a second salient entity tag of the set of one or more salient entity tags is indicative of the second entity (e.g., John Diggle) and/or a third salient entity tag of the set of one or more salient entity tags is indicative of the fourth entity (e.g., 2028 election), the article 502 may be selected for inclusion in the content list based upon a determination that historical activity information, comprised in the user profile, is indicative of the first client device 500 having accessed one or more content items (e.g., articles, videos, images, audio files, etc.) that are about and/or that comprise indications of James Cunningham, John Diggle and/or 2028 election.

In an example in which the first set of one or more entity types is indicative of an entity sub-type corresponding to "politician", the article 502 may be selected for inclusion in the content list based upon a determination that historical activity information, comprised in the user profile, is indicative of the first client device 500 having accessed one or more content items (e.g., articles, videos, images, audio files, etc.) that are about and/or that comprise indications of entities that are politicians.

In some examples, the first selectable input 554 may be included in the content list based upon (and/or in response to) selecting the article 502 for inclusion in the content list.

In some examples, a request to present the article 502 may be received from the first client device 500. For example, the request may be received in response to a selection of the first selectable list item 554 associated with the article 502. In response to receiving the request to present the article 502, the article 502 and/or one or more representations of the set of one or more salient entity tags may be displayed. For example, a web page 574 comprising the article 502 and/or the one or more representations may be accessed and/or presented via the first client device 500, such as shown in FIG. 5F.

Alternatively and/or additionally, in some examples, such as in an example in which the article 502 corresponds to a transcript of a video clip, a request to present the video clip may be received from the first client device 500. In response to receiving the request to present the video clip, the video clip and/or the one or more representations of the set of one or more salient entity tags may be displayed (e.g., the web page 574 may comprise the one or more representations and/or the video clip, wherein the video clip may be played on the first client device 500 using a media player).

Alternatively and/or additionally, in some examples, such as in an example in which the article 502 corresponds to a transcript of a audio clip, a request to present the audio clip may be received from the first client device 500. In response to receiving the request to present the audio clip, the one or more representations of the set of one or more salient entity tags may be displayed and/or the audio clip may be played (e.g., the one or more representations of the set of one or more salient entity tags may be displayed while the audio clip is played).

Figure 5F:
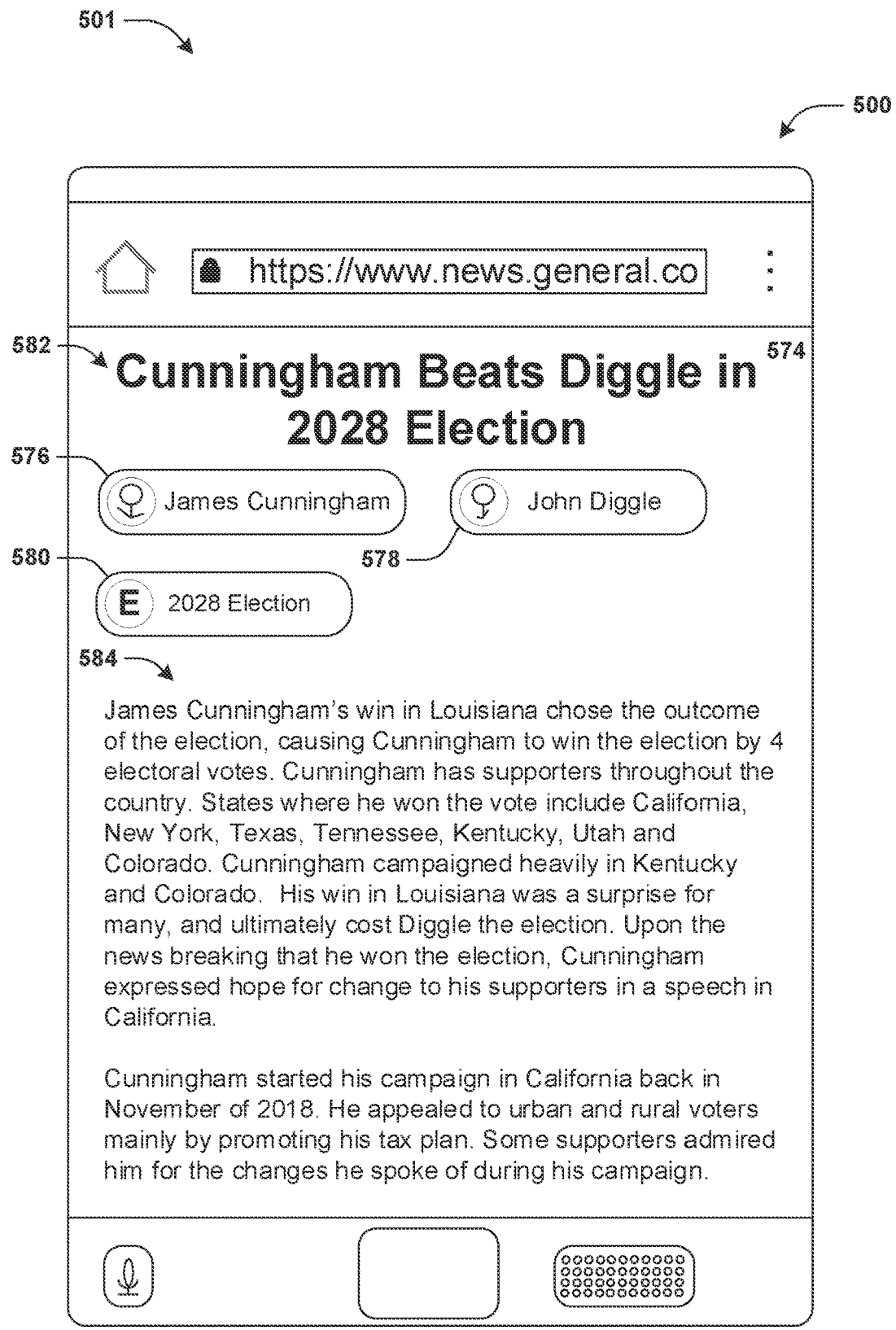
FIG. 5F is a component block diagram illustrating an example system for determining salient entities and/or generating salient entity tags based upon articles, where a first client device displays an article and/or one or more representations of one or more salient entity tags.

In an example shown in FIG. 5F, the one or more representations may comprise a first representation 576 of the first salient entity tag (indicative of the first entity, for example), a second representation 578 of the second salient entity tag (indicative of the second entity, for example) and/or a third representation 580 of the third salient entity tag (indicative of the fourth entity, for example). In some examples, a representation of the one or more representations may comprise a graphical object (e.g., an image, a symbol, etc.) representative of an entity indicated by a salient entity tag associated with the representation. For example, the first representation 576 may comprise an image of the first entity. Alternatively and/or additionally, in an example where a salient entity tag of the set of one or more salient entity tags is associated with (e.g., indicative of) an entity corresponding to a company and/or a security, a representation associated with the salient entity tag may comprise a stock symbol and/or a ticker symbol associated with the company and/or the security (and/or the representation may comprise an indication of a price of a security associated with the company and/or the indication of the price may be updated periodically).

In some examples, rankings of salient entity tags of the set of one or more salient entity tags may be determined based upon sets of reference position information, of the one or more sets of reference position information, associated with the salient entity tags and/or based upon entity term relevance scores, of the one or more first entity term relevance scores, associated with the salient entity tags. In an example, the rankings of the salient entity tags may be determined based upon scores, of the one or more scores associated with the first set of one or more entity terms 516, associated with the salient entity tags (wherein the scores are based upon the sets of reference position information and/or the entity term relevance scores).

The sets of reference position information associated with the salient entity tags may be sets of reference position information associated with entity terms (of the second set of one or more entity terms 520, for example) that are indicated by the salient entity tags. In an example in which the salient entity tags comprise the first salient entity tag (indicative of the first entity and/or the first entity term), the second salient entity tag (indicative of the second entity and/or the second entity term) and/or the third salient entity tag (indicative of the fourth entity and/or the fourth entity term), the sets of reference position information may comprise the first set of reference position information associated with the first entity term, a second set of reference position information associated with the second entity term and/or a third set of reference position information associated with the fourth entity term.

The entity term relevance scores associated with the salient entity tags may be entity term relevance scores associated with entity terms (of the second set of one or more entity terms 520, for example) that are indicated by the salient entity tags. In an example in which the salient entity tags comprise the first salient entity tag (indicative of the first entity and/or the first entity term), the second salient entity tag (indicative of the second entity and/or the second entity term) and/or the third salient entity tag (indicative of the fourth entity and/or the fourth entity term), the entity term relevance scores may comprise the first entity term relevance score associated with the first entity term, a second entity term relevance score associated with the second entity term and/or a third entity term relevance score associated with the fourth entity term.

The scores associated with the salient entity tags may be scores associated with entity terms (of the first set of one or more entity terms 516, for example) that are indicated by the salient entity tags. In an example in which the salient entity tags comprise the first salient entity tag (indicative of the first entity and/or the first entity term), the second salient entity tag (indicative of the second entity and/or the second entity term) and/or the third salient entity tag (indicative of the fourth entity and/or the fourth entity term), the scores may comprise the first score (of the one or more scores) associated with the first entity term, a second score (of the one or more scores) associated with the second entity term and/or a third score (of the one or more scores) associated with the fourth entity term. In an example, the rankings may indicate the first salient entity tag ranked over the second salient entity tag based upon the first score being higher than the second score.

Alternatively and/or additionally, second scores associated with the salient entity tags may be determined based upon the scores associated with the salient entity tags and/or sets of entity types (of the one or more sets of entity types) associated with the salient entity tags. In some examples, the second scores may comprise a fourth score associated with the first salient entity tag. For example, the fourth score may be determined based upon the first score and/or the first set of one or more entity types. In an example, the fourth score may be determined based upon the first score, one or more importance levels of one or more entity super-types of the first set of one or more entity types and/or one or more importance levels of one or more entity sub-types of the first set of one or more entity types. For example, the one or more importance levels of the one or more entity super-types and/or the one or more importance levels of the one or more entity sub-types may be determined based upon a list of entity type importance levels (indicative of importance levels of entity super-types and/or importance levels of entity sub-types, for example). In some examples, a higher value of an importance level (e.g., an importance level of the one or more importance levels of the one or more entity super-types and/or the one or more importance levels of the one or more entity sub-types) may correspond to a higher value of the fourth score. In an example, the rankings may indicate the first salient entity tag ranked over the second salient entity tag based upon the fourth score being higher than a fifth score, of the second scores, associated with the second salient entity tag.

In some examples, an arrangement of the salient entity tags may be determined based upon the rankings of the salient entity tags. Alternatively and/or additionally, the one or more representations (e.g., representations of the salient entity tags) may be displayed via the first client device 500 (and/or the web page 574) based upon the arrangement. In an example, the first representation 576 may be displayed above and/or to the left of the second representation 578 and/or the third representation 580 based upon a determination that the first salient entity tag is ranked over the second salient entity tag and/or the third salient entity tag.

In some examples, the one or more representations are displayed above at least some of the article 502. For example, the one or more representations may be displayed above an article body 584 of the article 502 and/or below the title 582 of the article 502. Alternatively and/or additionally, the one or more representations may be displayed above the title 582 and/or at a different location with respect to the article 502.

Figure 5G:
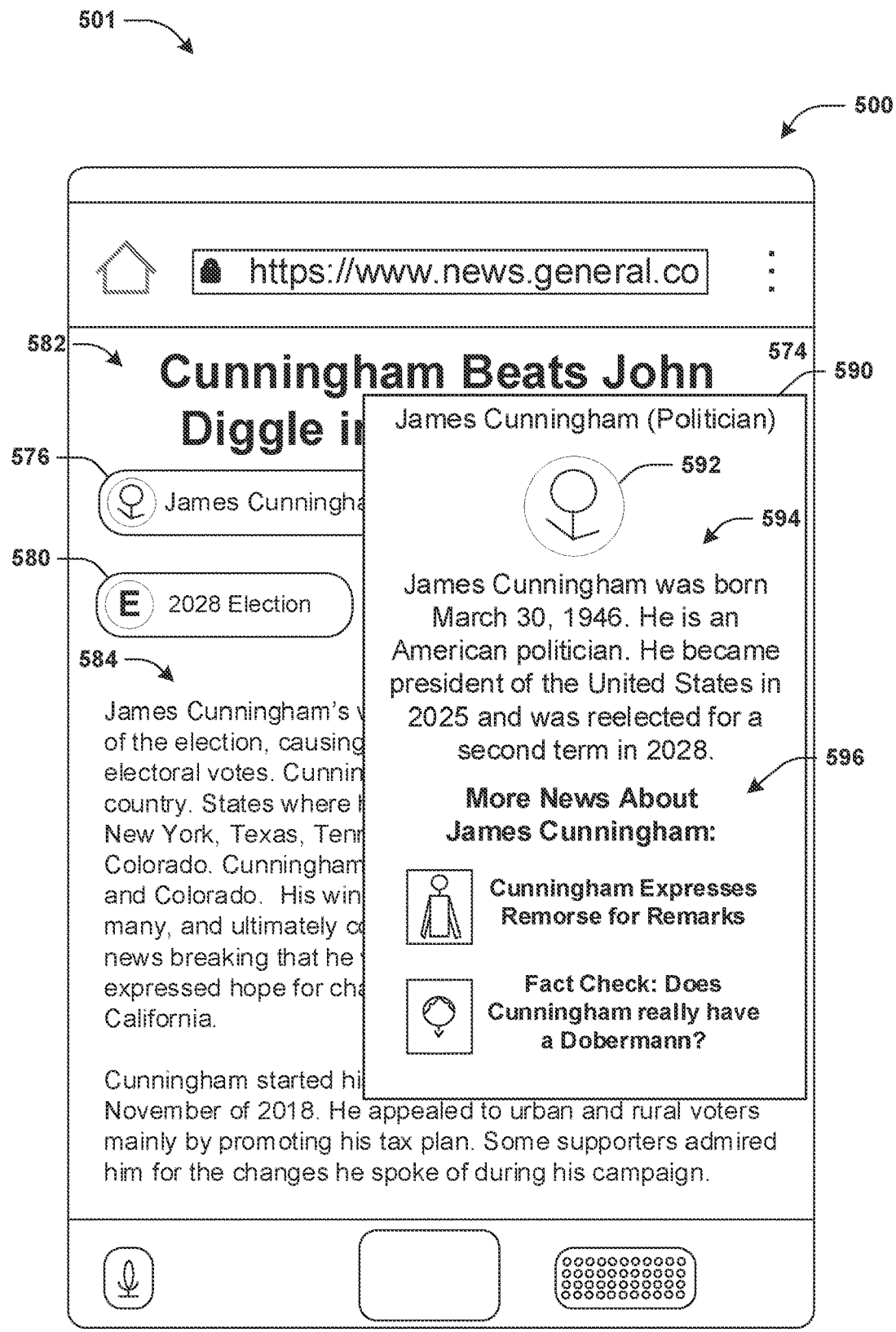
FIG. 5G is a component block diagram illustrating an example system for determining salient entities and/or generating salient entity tags based upon articles, where a first client device displays a representation of a first set of information associated with a first salient entity tag.

In some examples, one or more sets of information associated with the set of one or more salient entity tags may be determined. A set of information of the one or more sets of information may be indicative of information associated with (e.g., about) an entity associated with a salient entity tag of the set of one or more salient entity tags. In an example, the one or more sets of information may comprise a first set of information associated with the first entity and/or the first salient entity tag. In some examples, the first set of information may be generated based upon the first informational article 530 and/or based upon other information about the first entity (e.g., the first set of information may be generated based upon information about the first entity based upon the determination that the first entity term of the article 502 is indicative of the first entity). In some examples, the first set of information may comprise information associated with (e.g., about) the first entity. In some examples, a representation of the first set of information may be displayed via the first client device 500 and/or the web page 574. For example, the representation of the first set of information may be displayed in response to one or more interactions with the first representation 576 (such as in response to a selection of the first representation 576 and/or in response to a cursor hovering over the first representation 576). Alternatively and/or additionally, the first set of information may comprise a list of content items comprising one or more links to one or more content items associated with the first entity. For example, the one or more content items may comprise at least one of one or more articles, one or more video clips, etc. The one or more content items may be included in the list of content items based upon a determination that each content item of the one or more content items is associated with the first entity. For example, a content item may be included in the list of content items based upon a determination that the first entity is a salient entity of the content item (such as determined using one or more of the techniques provided herein). FIG. 5G illustrates the representation (shown with reference number 590) of the first set of information being displayed via the first client device 500 and/or the web page 574. In an example, the representation 590 of the first set of information may comprise an image 592 of the first entity, information 594 about the first entity and/or the list of content items (shown with reference number 596) associated with the first entity. In some examples, the set of one or more salient entity tags may be evaluated based upon activity associated with the set of one or more salient entity tags. For example, the first salient entity tag may be evaluated based upon first activity associated with the first salient entity tag. The first activity may comprise at least one of one or more selections of the first representation 576 of the first salient entity tag, the representation 590 of the first set of information being displayed and/or opened, a selection of a list item (e.g., a link to at least one of an article, a link, etc.) of the list of content items 596 associated with the first entity, etc. In some examples, if an amount of activity of the first activity is less than a threshold activity, the first salient entity tag may be removed from the set of one or more salient entity tags. Alternatively and/or additionally, if the amount of activity of the first activity exceeds the threshold activity, the first salient entity may not be removed from the set of one or more salient entity tags.

It may be appreciated that the disclosed subject matter may assist a user in determining the one or more salient entities of the article 502 (e.g., as a result of displaying the one or more representations of the set of one or more salient entity tags). Alternatively and/or additionally, the disclosed subject matter may assist the user in viewing content that the user has an interest in (e.g., as a result of selecting the article 502 for inclusion in the content list based upon the set of one or more salient entity tags).

It may be appreciated that by using one or more of the techniques herein, the set of one or more salient entity tags may be generated and/or the one or more salient entities of the article 502 may be determined with increased accuracy, increased precision and/or increased recall. The increased accuracy, increased precision and/or increased recall may be at least partly due to generating the set of one or more salient entity tags and/or determining the one or more salient entities based upon entity term relevance scores and/or reference position information associated with entity terms of the article 502. Alternatively and/or additionally, the increased accuracy, increased precision and/or increased recall may be at least partly due to determining that the first entity term corresponds to the first entity based upon a determination that the first similarity score exceeds the threshold similarity score, wherein the first salient entity tag may be indicative of the first entity based upon the determination that the first entity term of the article 502 is indicative of the first entity (and/or based upon the determination that the first similarity score exceeds the second similarity score), and/or wherein the first salient entity tag may be included in the set of one or more salient entity tags based upon the determination that the first entity term of the article 502 is indicative of the first entity (such that salient entity tags associated with ambiguous entity terms are not included in the set of one or more salient entity tags and/or such that salient entity tags of the one or more salient entity tags are not indicative of incorrect entities, for example).

Alternatively and/or additionally, implementation of at least some of the disclosed subject matter may lead to benefits including, but not limited to, providing more accurate information for presentation via the first client device 500 (e.g., as a result of determining the first set of information based upon the information about the first entity based upon the determination that the first entity term of the article 502 is indicative of the first entity such that the first set of information does not comprise information about a different entity, etc.).

Alternatively and/or additionally, implementation of at least some of the disclosed subject matter may lead to benefits including a reduction in screen space and/or an improved usability of a display of the first client device 500 (e.g., as a result of generating the set of one or more salient entity tags and/or displaying one or more representations of the set of one or more salient entity tags such that indications of salient entities of the article 502 are automatically displayed via the first client device 500, etc.).

Alternatively and/or additionally, implementation of at least some of the disclosed subject matter may lead to benefits including increasing an accuracy and/or precision in transmitting requested and/or desired content to the first client device 500 and/or presenting the requested and/or desired content to a user of the first client device 500 (e.g., as a result of enabling the first client device 500 to display one or more representations of the set of one or more salient entity tags such that the user of the first client device 500 may understand and/or determine salient entities of the article 502 without having to consume the article 502).

Alternatively and/or additionally, implementation of at least some of the disclosed subject matter may lead to benefits including less manual effort (e.g., as a result of generating the set of one or more salient entity tags automatically, wherein manual editing to produce the set of one or more salient entity tags may not be required because the article 502 and/or entity terms of the article 502 (and/or other information) may be automatically analyzed to generate the set of one or more salient entity tags).

In some embodiments of the present disclosure, an order in which operations are performed to determine the one or more salient entities and/or generate the one or more salient entity tags may be different than the method 400.

In an example, the article 502 may be analyzed to identify one or more first entity terms of the article 502, wherein each entity term of the one or more first entity terms is referred to in the one or more first sections of the article 502 and/or wherein the one or more first entity terms comprises a first entity term indicative of the first entity (e.g., the article 502 may be analyzed to identify and/or select the one or more first entity terms based upon a determination that for each entity term of the one or more first entity terms, the one or more first sections comprise a reference to the entity term). One or more first entity term relevance scores associated with the one or more first entity terms may be determined based upon the article 502 and/or the one or more first entity terms, wherein the one or more first entity term relevance scores comprise the first entity term relevance score associated with the first entity term. One or more second entity terms of the one or more first entity terms may be selected based upon the one or more first entity term relevance scores (such as based upon a determination that one or more second entity term relevance scores, of the one or more first entity term relevance scores, associated with the one or more second entity terms exceed a threshold entity term relevance score), wherein the one or more second entity terms comprise the first entity term. The set of one or more salient entity tags associated with the article 502 may be generated based upon the one or more second entity terms (such as using one or more of the techniques provided herein with respect to generating the set of one or more salient entity tags based upon the second set of one or more entity terms 520).

In an example, the article 502 may be analyzed to identify the plurality of entity terms 506. The plurality of entity term relevance scores 512 associated with the plurality of entity terms 506 may be determined based upon the article 502 and/or the plurality of entity terms 506. A plurality of sets of reference position information associated with the plurality of entity terms 506 may be determined (such as using one or more of the techniques provided herein with respect to determining the one or more sets of reference position information associated with the first set of one or more entity terms 516), wherein a first set of reference position information of the plurality of sets of reference position information is associated with the first entity term, and/or wherein the first set of reference position information is based upon one or more positions, in the article 502, of one or more references to the first entity term. One or more first entity terms of the plurality of entity terms 506 may be determined based upon the plurality of entity term relevance scores 512 and/or based upon the plurality of sets of reference position information, wherein the one or more first entity terms include the first entity term. For example, the first entity term may be selected for inclusion in the one or more first entity terms based upon a determination that the one or more first sections of the article 502 comprise a reference to the first entity term and/or that the first entity term relevance score associated with the first entity term exceeds a threshold entity term relevance score. The set of one or more salient entity tags associated with the article 502 may be generated based upon the one or more first entity terms (such as using one or more of the techniques provided herein with respect to generating the set of one or more salient entity tags based upon the second set of one or more entity terms 520).

In some examples, at least some of the disclosed subject matter may be implemented on a device (e.g., a client device), and in some examples, at least some of the disclosed subject matter may be implemented on a server (e.g., hosting a service accessible via a network, such as the Internet).

Figure 6:
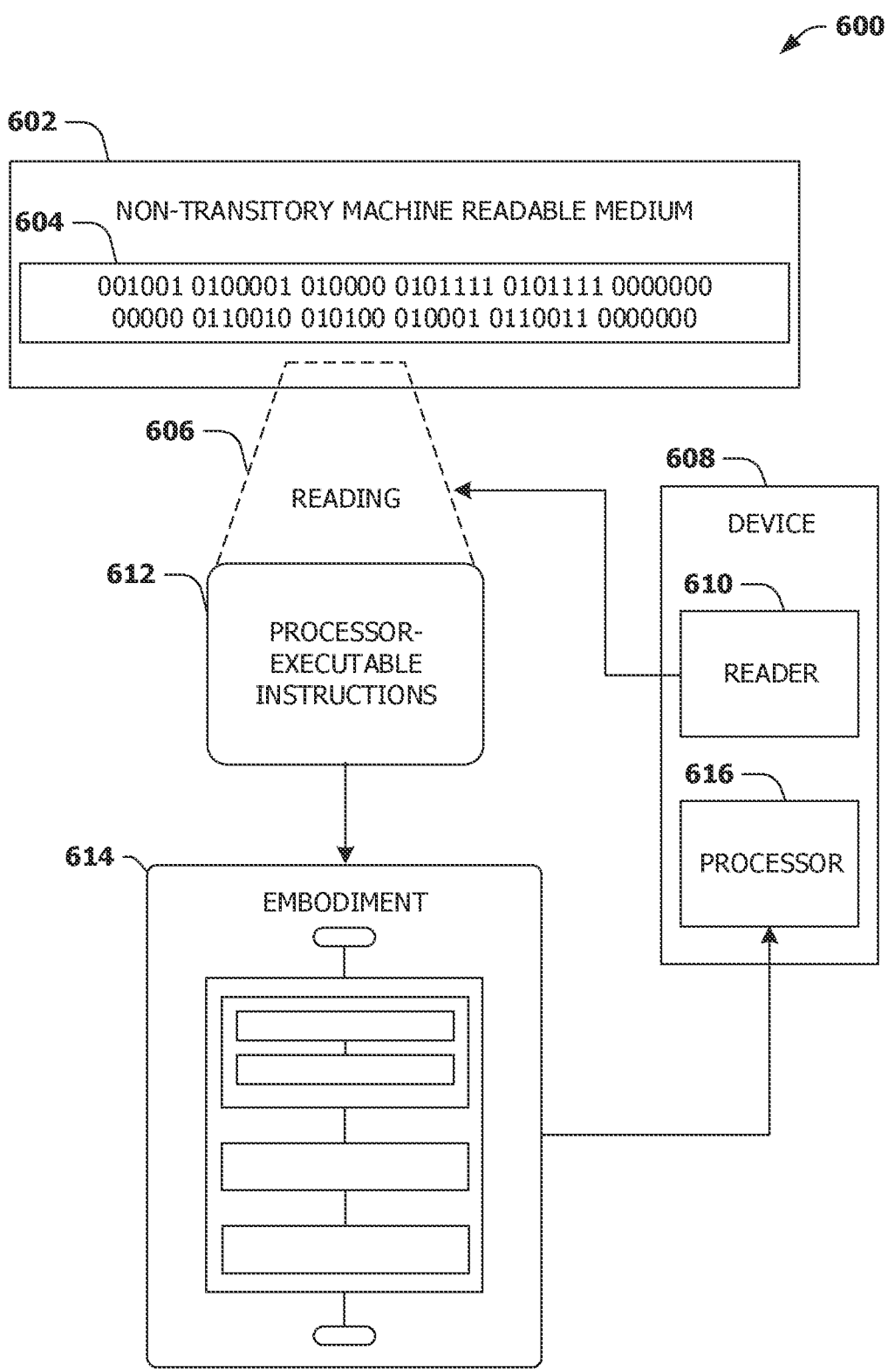
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    analyzing an article to identify a plurality of entity terms comprising a first entity term;
    identifying one or more entities comprising a first entity based upon the first entity term;
    analyzing an informational database based upon the first entity term to identify a second article associated with the first entity from a plurality of informational articles of the informational database;
    determining a similarity score associated with a similarity between the article and the second article;
    determining that the first entity term is indicative of the first entity based upon a determination that the similarity score exceeds a threshold similarity score;
    determining, based upon the article and the plurality of entity terms, a plurality of entity term relevance scores associated with the plurality of entity terms, wherein a first entity term relevance score of the plurality of entity term relevance scores is associated with the first entity term;
    selecting one or more first entity terms of the plurality of entity terms based upon the plurality of entity term relevance scores, wherein the one or more first entity terms comprise the first entity term;
    determining one or more sets of reference position information associated with the one or more first entity terms, wherein:
        a first set of reference position information of the one or more sets of reference position information is associated with the first entity term; and
        the first set of reference position information is based upon one or more positions, in the article, of one or more references to the first entity term;
    selecting one or more second entity terms of the one or more first entity terms based upon the one or more sets of reference position information, wherein the one or more second entity terms comprise the first entity term; and
    generating, based upon the one or more second entity terms, a set of one or more salient entity tags associated with the article, wherein a first salient entity tag of the set of one or more salient entity tags is indicative of the first entity.

2. The method of claim 1, comprising:
    receiving a request from a client device to present the article; and
    controlling a graphical user interface of the client device to display the article and one or more representations of one or more salient entity tags of the set of one or more salient entity tags.

3. The method of claim 2, wherein:
    the controlling the graphical user interface of the client device comprises displaying the one or more representations above at least some of the article.

4. The method of claim 3, comprising:
    determining rankings of salient entity tags of the set of one or more salient entity tags based upon at least one of:
        sets of reference position information, of the one or more sets of reference position information, associated with the salient entity tags of the set of one or more salient entity tags; or
        entity term relevance scores, of the plurality of entity term relevance scores, associated with the salient entity tags of the set of one or more salient entity tags; and
    determining an arrangement of the salient entity tags of the set of one or more salient entity tags based upon the rankings of the salient entity tags, wherein the controlling the graphical user interface of the client device comprises displaying the one or more representations according to the arrangement.

5. The method of claim 2, comprising:
    determining a set of information associated with the first entity; and
    controlling the graphical user interface of the client device to display a representation of the set of information.

6. The method of claim 1, comprising:
    receiving a request from a client device to present a list of content items;
    selecting the article for inclusion in the list of content items based upon the set of one or more salient entity tags; and
    controlling a graphical user interface of the client device to display the list of content items, wherein the list of content items comprises a list item corresponding to the article.

7. The method of claim 6, wherein:
    the selecting the article for inclusion in the list of content items based upon the set of one or more salient entity tags is based upon a determination that historical activity information associated with the client device is indicative of one or more content items associated with the first entity.

8. The method of claim 1, wherein:
the first set of reference position information is indicative of whether one or more first sections of the article comprise a reference to the first entity term; and
the selecting the one or more second entity terms comprises selecting the first entity term based upon a determination that the one or more first sections of the article comprise a reference to the first entity term.

9. The method of claim 8, wherein:
the one or more first sections comprise at least one of:
a summary of the article;
a title of the article; or
a paragraph of the article.

10. The method of claim 1, wherein:
the informational database comprises an encyclopedia.

11. The method of claim 1, wherein:
the generating the set of one or more salient entity tags comprises including the first salient entity tag, indicative of the first entity, in the set of one or more salient entity tags based upon the determining that the first entity term is indicative of the first entity.

12. The method of claim 1, wherein:
the selecting the one or more first entity terms is based upon a determination that one or more first entity term relevance scores, of the plurality of entity term relevance scores, associated with the one or more first entity terms exceed a threshold entity term relevance score.

13. A computing device comprising:
a processor; and
memory comprising processor-executable instructions that when executed by the processor cause performance of operations, the operations comprising:
analyzing an article to identify one or more first entity terms of the article, wherein:
each entity term of the one or more first entity terms is referred to in one or more first sections of the article; and
the one or more first entity terms comprises a first entity term;
identifying one or more entities comprising a first entity based upon the first entity term;
analyzing an informational database based upon the first entity term to identify a second article associated with the first entity from a plurality of informational articles of the informational database;
determining a similarity score associated with a similarity between the article and the second article;
determining that the first entity term is indicative of the first entity based upon a determination that the similarity score exceeds a threshold similarity score;
determining, based upon the article and the one or more first entity terms, one or more first entity term relevance scores associated with the one or more first entity terms, wherein a first entity term relevance score of the one or more first entity term relevance scores is associated with the first entity term;
selecting one or more second entity terms of the one or more first entity terms based upon the one or more first entity term relevance scores, wherein the one or more second entity terms comprise the first entity term; and
generating, based upon the one or more second entity terms, a set of one or more salient entity tags associated with the article, wherein a first salient entity tag of the set of one or more salient entity tags is indicative of the first entity.

14. The computing device of claim 13, the operations comprising:
receiving a request from a client device to present the article; and
controlling a graphical user interface of the client device to display the article and one or more representations of one or more salient entity tags of the set of one or more salient entity tags.

15. The computing device of claim 14, wherein:
the controlling the graphical user interface of the client device comprises displaying the one or more representations above at least some of the article.

16. The computing device of claim 15, the operations comprising:
determining rankings of salient entity tags of the set of one or more salient entity tags based upon at least one of:
reference position information associated with the salient entity tags of the set of one or more salient entity tags; or
entity term relevance scores, of the one or more first entity term relevance scores, associated with the salient entity tags of the set of one or more salient entity tags; and
determining an arrangement of the salient entity tags of the set of one or more salient entity tags based upon the rankings of the salient entity tags, wherein the controlling the graphical user interface of the client device comprises displaying the one or more representations according to the arrangement.

17. The computing device of claim 13, wherein:
the selecting the one or more second entity terms is performed based upon a determination that one or more second entity term relevance scores, of the one or more first entity term relevance scores, associated with the one or more second entity terms exceed a threshold entity term relevance score.

18. The computing device of claim 13, wherein:
the one or more first sections comprise at least one of:
a summary of the article;
a title of the article; or
a paragraph of the article.

19. A non-transitory machine readable medium having stored thereon processor-executable instructions that when executed cause performance of operations, the operations comprising:
analyzing an article to identify a plurality of entity terms comprising a first entity term;
identifying one or more entities comprising a first entity based upon the first entity term;
analyzing an informational database based upon the first entity term to identify a second article associated with the first entity from a plurality of informational articles of the informational database;
determining a similarity score associated with a similarity between the article and the second article;
determining that the first entity term is indicative of the first entity based upon a determination that the similarity score exceeds a threshold similarity score;
determining, based upon the article and the plurality of entity terms, a plurality of entity term relevance scores associated with the plurality of entity terms, wherein a first entity term relevance score of the plurality of entity term relevance scores is associated with the first entity term;

determining a plurality of sets of reference position information associated with the plurality of entity terms, wherein:
- a first set of reference position information of the plurality of sets of reference position information is associated with the first entity term; and
- the first set of reference position information is based upon one or more positions, in the article, of one or more references to the first entity term;

selecting one or more first entity terms of the plurality of entity terms based upon the plurality of entity term relevance scores and the plurality of sets of reference position information, wherein the one or more first entity terms comprise the first entity term; and generating, based upon the one or more first entity terms, a set of one or more salient entity tags associated with the article, wherein a first salient entity tag of the set of one or more salient entity tags is indicative of the first entity.

20. The non-transitory machine readable medium of claim 19, wherein:
- the first set of reference position information is indicative of whether one or more first sections of the article comprise a reference to the first entity term; and
- the selecting the one or more first entity terms comprises selecting the first entity term based upon a determination that:
  - the one or more first sections of the article comprise a reference to the first entity term; and
  - the first entity term relevance score exceeds a threshold entity term relevance score.

* * * * *